United States Patent [19]

Johnson et al.

[11] Patent Number: 4,728,061
[45] Date of Patent: Mar. 1, 1988

[54] SPACECRAFT OPERABLE IN TWO ALTERNATIVE FLIGHT MODES

[75] Inventors: Caldwell C. Johnson; Maxime A. Faget, both of Dickinson; David J. Bergeron, III, Houston, all of Tex.

[73] Assignee: Space Industries, Inc., Webster, Tex.

[21] Appl. No.: 713,816

[22] Filed: Mar. 20, 1985

[51] Int. Cl.⁴ .................. B64G 1/34; B64G 1/24; B64G 1/36
[52] U.S. Cl. .................. 244/164; 244/167; 244/168; 244/171; 244/173
[58] Field of Search .......... 244/158 R, 164, 165, 244/167, 168, 172, 171, 173

[56] References Cited

U.S. PATENT DOCUMENTS

| | | |
|---|---|---|
| 3,145,948 | 8/1964 | Kershner . |
| 3,148,846 | 9/1964 | Newton . |
| 3,168,263 | 2/1965 | Kamm . |
| 3,241,142 | 3/1966 | Raabe . |
| 3,243,143 | 3/1966 | Dickstein et al. . |
| 3,268,183 | 8/1966 | Etkin . |
| 3,282,532 | 11/1966 | Tinling et al. . |
| 3,362,656 | 1/1968 | Wyatt . |
| 3,367,604 | 2/1968 | Matteo . |
| 3,386,686 | 6/1968 | Phillips . |
| 3,429,525 | 2/1969 | Rushing . |
| 3,480,232 | 11/1969 | Wyatt . |
| 3,500,417 | 3/1970 | Adams . |
| 3,516,622 | 6/1970 | Paige et al. . |
| 3,519,222 | 7/1970 | Altekruse et al. . |
| 3,540,676 | 11/1970 | Madey et al. . |
| 3,567,155 | 3/1971 | Gatlin et al. . |
| 3,582,020 | 6/1971 | Wrench . |
| 3,601,338 | 8/1971 | Shigehara . |
| 3,635,425 | 1/1972 | Swet . |
| 3,640,487 | 2/1972 | Wanger . |
| 3,768,756 | 10/1973 | Buckingham . |
| 4,384,692 | 5/1983 | Preukschat ............ 244/173 |

OTHER PUBLICATIONS

Kershner, R. B., "Gravity-Gradient Stabilization of Satellites", *Astronautics and Aerospace Engineering*, pp. 18-22, Sep. 1963.

*Primary Examiner*—Jeffrey V. Nase
*Assistant Examiner*—Rodney Corl
*Attorney, Agent, or Firm*—Robbins & Laramie

[57] ABSTRACT

A spacecraft is adapted for orbital flight in two alternative modes, referred to as the earth-oriented and quasi sun-oriented modes. The spacecraft comprises a spacecraft body, at least one solar array extendible outwardly from the spacecraft body, passive attitude control means utilizing gravity gradient stabilization means which is extendible and retractable relative to the spacecraft body, and active attitude control means. The gravity gradient stabilization means is effective when extended to stabilize the spacecraft in the earth-oriented mode, and the active attitude control means is effective to stabilize the spacecraft in the quasi sun-oriented mode.

21 Claims, 14 Drawing Figures

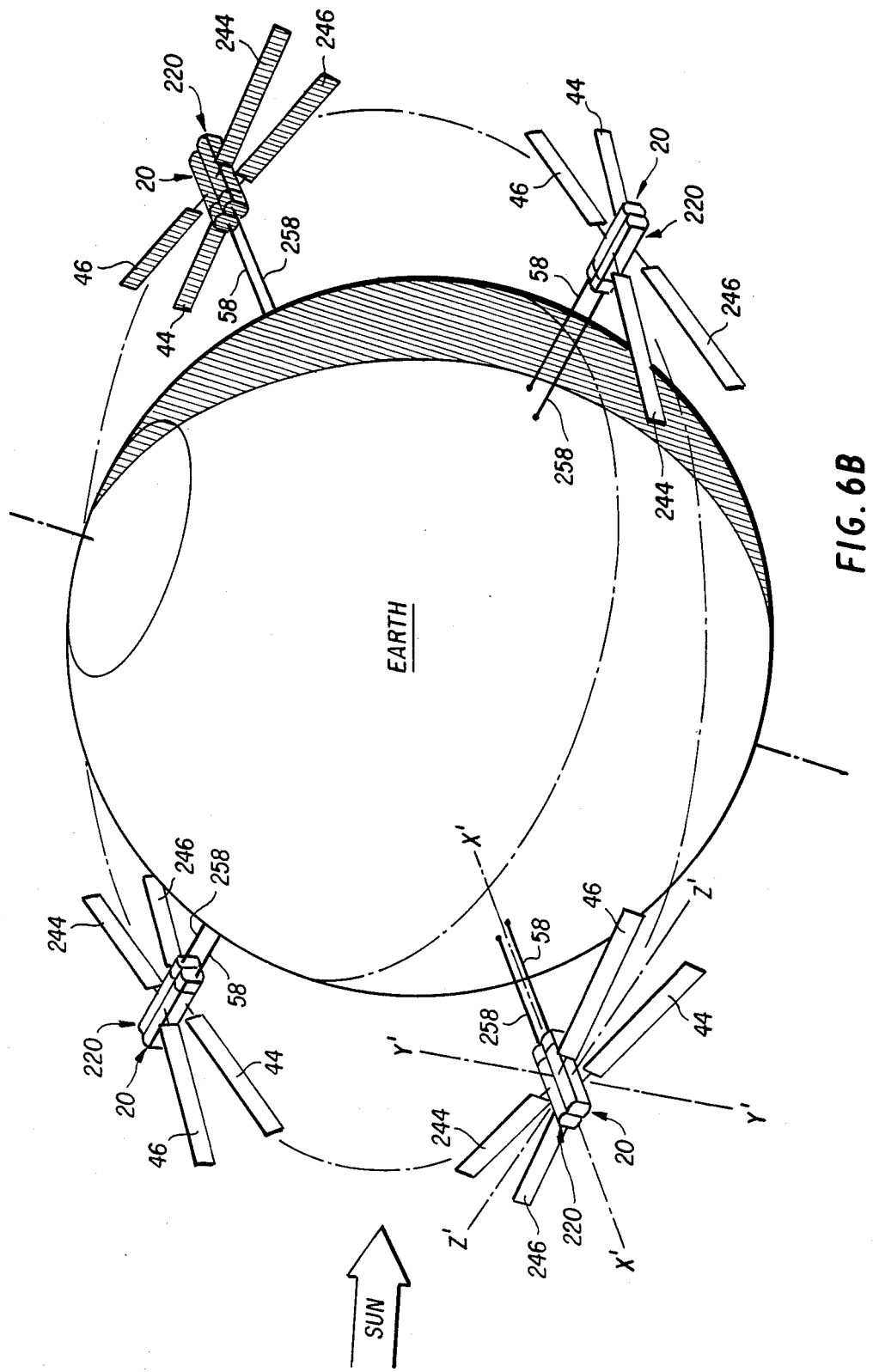

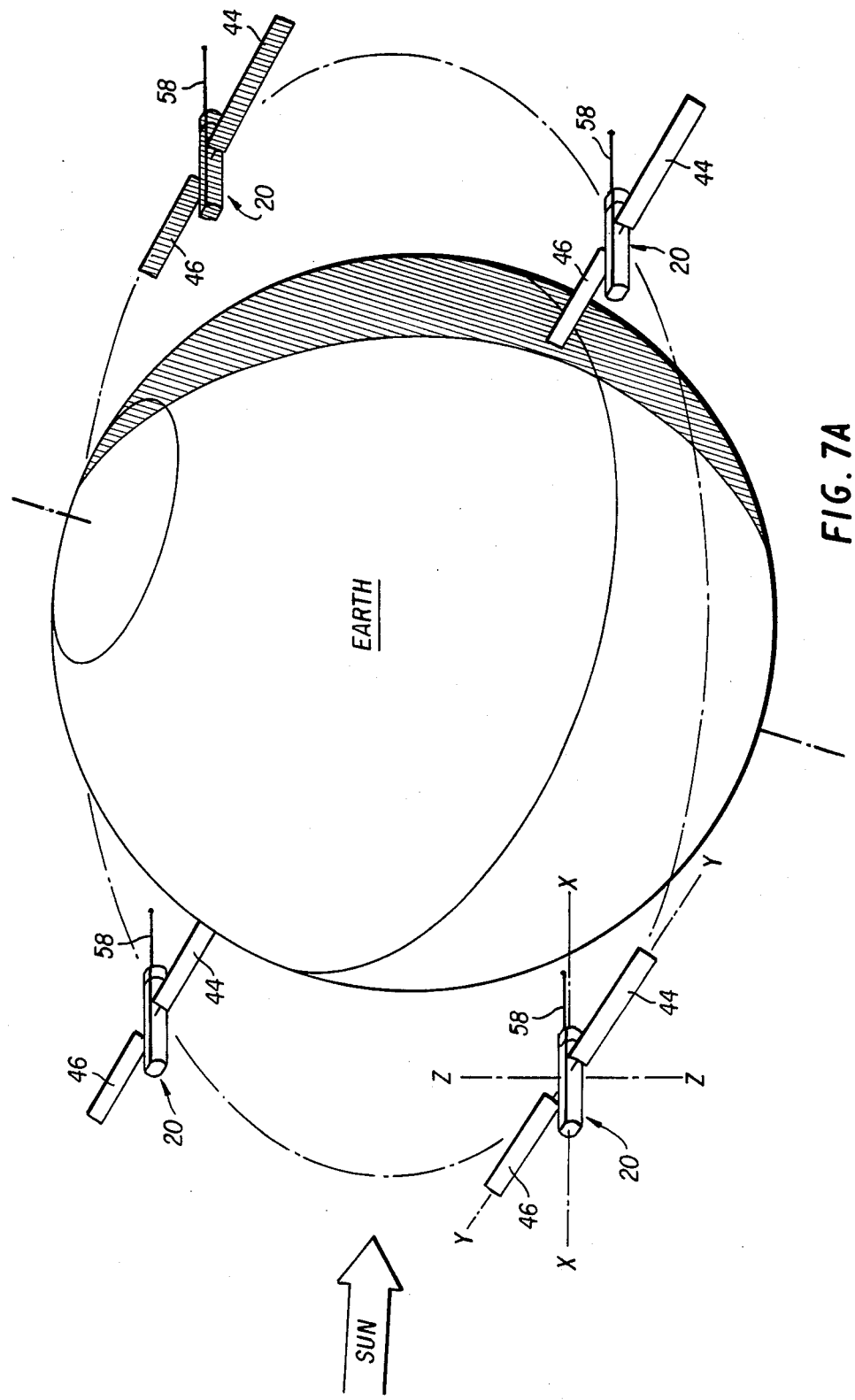

SPACECRAFT OPERABLE IN TWO ALTERNATIVE FLIGHT MODES

CROSS REFERENCE TO RELATED APPLICATIONS

Related subject matter is disclosed and claimed in U.S. patent application Ser. No. 713,817, entitled "Modular Spacecraft System", and in U.S. patent application Ser. No. 713,882, entitled "Spacecraft with Articulated Solar Array and Method for Array Deployment", both filed on Mar. 20, 1985.

BACKGROUND OF THE INVENTION

1. Field of the Invention

This invention relates to a spacecraft capable of orbital flight in two alternative flight modes. The invention also relates to an attitude control method for controlling the orbital flight of the spacecraft in two alternative flight modes.

2. Description of the Prior Art

Various systems have been proposed for controlling attitude of an orbiting spacecraft, such as a satellite, with respect to the earth or the sun during its orbital flight. These systems fall generally into two categories, known as active attitude control systems and passive attitude control systems. Active attitude control systems include devices such as control moment gyroscopes, momentum wheels, thrusters, and magnetic torquers. Passive attitude control methods may include spin stabilization, gravity gradient stabilization, and magnetic field stabilization.

Gravity gradient stabilization has been used effectively to maintain an antenna or other instrument on a satellite pointing toward the earth. The principle of gravity gradient stabilization can be understood by considering the attitude motion of a satellite in the shape of a dumbbell consisting of two equal masses separated by a rod. Since the force of gravity is inversely proportional to the square of the distance from the center of the earth, the mass nearest to the center is attracted a little more strongly than the mass further away. This gradient in the gravitational field produces a torque tending to align the dumbbell with the local vertical. A deflection of the dumbbell away from the local vertical causes a restoring torque to be generated by the imbalance of the forces acting on the equal masses. The centrigual force on one would be greater than the gravitational force on it, because these two forces are only equal at the center of mass. By contrast, the gravitational force on the other mass is greater than the centrifugal force on it, thus creating a net torque which forces the masses toward an alignment in the local vertical orientation. A horizontal orientation of the dumbbell is an unstable state of equilibrium. Although the forces on each mass are nominally equal, a slight rotation immediately increases the gravitational attraction of the lower mass and decreases the gravitational attraction on the upper mass. At the other extreme, a vertical orientation is a stable state of equilibrium because the difference in attraction for the two masses is at a maximum. Thus, the force of gravity will cause the axis of minimum moment of inertia of the spacecraft to align with the local vertical and point toward the earth or other body about which the spacecraft is orbiting. It is also true that when one axis of the spacecraft possesses the maximum moment of inertia, the dynamics of orbital motion causes that axis of the spacecraft to align normal to the orbital plane.

A number of systems have been proposed for the gravity gradient stabilization of satellites. In all of these systems, a rod-or boom-like structure extends outwardly from the satellite body. The rods or booms are usually of the type which are extendible after the satellite is in orbit and may be articulated to permit angular movement thereof. A weight is normally located at the end of the rod or boom. All of these rod and boom structures are intended to produce a satellite having a more dumbbell-like configuration in which the axis of the satellite along which the rod or boom lies will tend to align with the local vertical. In order to obtain structures which will exhibit the greatest amount of gravity gradient stability, the booms or rods are fully extended and are maintained in that position.

It has been found in a number of these gravity gradient stabilization techniques that the gravity gradient device tends to librate about the local vertical. Various dampers have been suggested as a means for controlling the librations of the gravity gradient devices. Since such damping devices are not universally effective, active attitude control devices have been suggested for use in connection with the passive gravity gradient stabilization techniques to damp the librations. However, applications of active attitude control devices for damping such librations are generally smaller, less costly, and more reliable than for applications where both attitude positioning and damping is required.

All of the prior art techniques for gravity gradient stabilization of orbiting satellites are designed to maintain the axis of the satellite having the least moment of inertia aligned with the local vertical and always pointing toward the earth during its orbital flight. Because these techniques were designed solely for an orbital flight mode in which an antenna or other instrument would always be facing toward the earth, they do not provide means for operating a satellite in a different orbital flight mode in which it would be oriented so that it faced in a direction other than toward the earth.

SUMMARY OF THE INVENTION

The present invention relates to a spacecraft which overcomes the inherent limitations of the prior art spacecraft designed for orbital flight in only one mode and which is capable of controlled orbital flight in two alternative flight modes. In each of the two alternative flight modes, the spacecraft of the present invention is capable of orbital flight in two alternative attitudes. Any type of spacecraft suitable for orbital flight around the earth or other body can be employed in the present invention, provided the spacecraft is designed to function in at least one of the two alternative flight modes of which the present spacecraft is capable. In a preferred embodiment, the spacecraft of the present invention is a man-tended space platform suitable for industrial or research purposes.

The spacecraft of the present invention comprises a spacecraft body, the shape of which will depend to a large extent upon the specific equipment or payload to be carried by a spacecraft. However, because the spacecraft is intended to be placed in orbit by the National Space Transportation System (NSTS), also referred to as the Space Shuttle, a spacecraft body having a generally cylindrical shape that will fit in the Shuttle cargo bay is preferred. The present spacecraft further comprises at least one solar array which extends outwardly from the side of the spacecraft body when deployed. Preferably, the spacecraft has two solar arrays which extend outwardly from opposite sides of the spacecraft body when deployed. The solar arrays are attached to the spacecraft body by articulation devices, such as gimbals, which permit them to be rotated freely in several directions. Optionally, the present spacecraft further comprises at least one structural interface means, such as a berthing mechanism, for connecting one spacecraft to another substantially identical spacecraft in a side-by-side arrangement.

In addition, the spacecraft of the present invention comprises both passive attitude control means and active attitude control means for maintaining the spacecraft in the desired orbital flight mode. Passive attitude control is achieved by means of a gravity gradient stabilization device which can be extended and retracted to any desired length or angle relative to the spacecraft body. A suitable gravity gradient stabilization device comprises an elongated member, such as a mast or boom, which is preferably of the coilable type. The gravity gradient boom can be extended outwardly from, or retracted into, one end of the spacecraft body. Preferably, a weight is attached to the outer end of the gravity gradient boom. The gravity gradient boom may also comprise means for adjusting the angle at which the boom extends from the spacecraft body.

When extended outwardly to a sufficient length or angle from the spacecraft body, the gravity gradient boom is effective to stabilize the spacecraft in an earth-facing orientation to provide an earth-oriented orbital flight mode. In this flight mode, the spacecraft is oriented with one of its orthogonal axes always substantially aligned with the local vertical, that is, always pointing radially toward the center of the earth. The second orthogonal axis of the spacecraft always extends substantially in a direction tangent to the orbital flight path in this mode, while the third orthogonal axis of the spacecraft is always oriented substantially normal to the orbital plane.

The active attitude control means can be any of a number of well-known devices such as control moment gyroscopes, momentum wheels, magnetic torquers, and gas thrusters. The active attitude control means is effective alone or in combination with the passive attitude control means to stabilize the spacecraft in a sun-facing orientation to provide a quasi sun-oriented orbital flight mode. In this mode, two of the orthogonal axes of the spacecraft always lie substantially in the orbital plane, and one of these two axes is always oriented substantially normal to the direction of solar radiation. The two solar arrays of the spacecraft extend generally along this axis. The third orthogonal axis of the spacecraft is always oriented substantially normal to the orbital plane in this mode. The term "quasi" sun-oriented is used to describe this flight mode because, although the spacecraft is always oriented with one axis normal to the direction of solar radiation, the attitude of the spacecraft as a whole is not fixed with respect to the sun. Since the earth spin axis is not in the plane of the ecliptic, all orbits about the earth will precess about the spin axis, thus changing the angle of the sun with respect to the orbital plane. In practice, this is accounted for by rotating the solar arrays periodically so that they are maintained normal to the direction of solar radiation.

In the earth-oriented flight mode, the present spacecraft is capable of orbital flight in two alternative attitudes. In one of these attitudes, the gravity gradient boom is aligned generally parallel to the first orthogonal axis of the spacecraft, which is substantially aligned with the local vertical, and each solar array is extended outwardly from the spacecraft body and is aligned generally along the second orthogonal axis of the spacecraft, which is substantially tangent to the orbital flight path. In the other attitude of this flight mode, the gravity gradient boom is aligned generally parallel to the first orthogonal axis of the spacecraft, which is substantially aligned with the local vertical, and each solar array is extended outwardly from a point on the spacecraft body which is generally along the second orthogonal axis of the spacecraft and is rotated about that point toward the third orthogonal axis. If the spacecraft has two solar arrays, the arrays are rotated in opposite directions about axes parallel to the first orthogonal axis toward each other. This positioning is particularly advantageous when two or more substantially identical spacecraft are connected together in a side-by-side arrangement.

In the quasi sun-oriented flight mode, the present spacecraft is likewise capable of orbital flight in two alternative attitudes. In one of these attitudes, the gravity gradient boom is aligned generally parallel to a first orthogonal axis of the spacecraft, which lies substantially in the orbital plane, and each solar array is extended outwardly from the spacecraft body generally along a second orthogonal axis of the spacecraft, which lies substantially in the orbital plane and which is substantially normal to the direction of solar radiation. In the other attitude of this flight mode, the gravity gradient boom is aligned generally parallel to the first orthogonal axis of the spacecraft, which lies substantially in the orbital plane, and each solar array is extended outwardly from a point on the spacecraft body which is generally along the second orthogonal axis of the spacecraft and is rotated about that point toward the third orthogonal axis. If the spacecraft has two solar arrays, the arrays are rotated in opposite directions about axes parallel to the first orthogonal axis toward each other. This attitude is particularly advantageous for the orbital flight of spacecraft connected in a side-by-side arrangement.

The two alternative orbital flight modes of which the spacecraft of the present invention is capable, and the two alternative flight attitudes which are possible in each of these modes, can be characterized in terms of the moments of inertia $I_{xx}$, $I_{yy}$ and $I_{zz}$ about the three orthogonal axes x, y and z, respectively, of the spacecraft. In the earth-oriented mode, the attitude of the spacecraft is controlled primarily by gravity gradient stabilization. Since the axis of minimum moment of inertia of the spacecraft will tend to align with the local vertical, the gravity gradient boom extends generally along such axis, to be designated x. The axis of the spacecraft having the next greatest moment of inertia will tend to align tangent to the orbital flight path. Finally, the axis of maximum moment of inertia of the spacecraft will tend to align normal to the orbital plane. Thus, the relationships between the moments of inertia of the three orthogonal axes of the spacecraft during the two flight attitudes of the earth-oriented mode are $I_{zz} > I_{yy} > I_{xx}$ and $I_{yy} > I_{zz} > I_{xx}$.

In the quasi sun-oriented mode, the attitude of the spacecraft about one of its axes is controlled primarily by an active attitude control means. In order to minimize the amount of active attitude control required, the spacecraft should be designated so that, if it cannot be inherently stable about all axes like the spacecraft in the earth-oriented mode, then it should be neutrally stable about one axis. If the moments of inertia about two of the axes are substantially equal, and both are less than the moment of inertia about the third axis, then the third axis will tend to align normal to the orbital plane and the other two axes will lie in the orbital plane in a neutrally stable position, since neither of these axes will have a greater tendency to align with the local vertical. Thus, the relationships between the moments of inertia of the three orthogonal axes of the spacecraft during the two flight attitudes of the quasi sun-oriented mode are $I_{zz} > I_{yy} \approx I_{xx}$ and $I_{yy} > I_{zz} \approx I_{xx}$. These relationships provide passive stability about two axes and neutral stability about the third axis. Hence, the active attitude control system can be the simplest possible for this flight mode, thus reducing weight and cost while at the same time increasing reliability.

In a further aspect, the present invention relates to an attitude control method for controlling the flight attitude of a spacecraft in two alternative flight modes. The method comprises stabilizing the spacecraft in an earth-oriented flight mode during a first period of time in which it is desired to minimize active attitude control by extending or retracting the gravity gradient boom, and stabilizing the spacecraft in a quasi sun-oriented flight mode by means of an active attitude control means during a second period of time in which it is desired to maximize the power output of the solar arrays. This would be accomplished by adjusting the length of the gravity gradient boom to equalize $I_{yy}$ and $I_{xx}$ or $I_{zz}$ and $I_{xx}$. The gravity gradient stabilization device can also be employed in conjunction with the active attitude control means to stabilize the spacecraft in the quasi sun-oriented flight mode.

The attitude control method of the present invention can be used to control the orbital flight of the present spacecraft in a flight mode characterized by unequal moments of inertia about two orthogonal axes of the spacecraft lying in the orbital plane, or in a flight mode characterized by substantially equal moments of inertia about the same two orthogonal axes of the spacecraft.

BRIEF DESCRIPTION OF THE DRAWINGS

The various objects, advantages and novel features of the present invention will be more clearly apprehended from the following detailed description when read in conjunction with the appended drawings, in which:

FIG. 6B is a diagrammatic illustration of the manner in which two coupled spacecraft may be caused to orbit about the earth in an earth-oriented flight mode;

FIG. 7A is a diagrammatic illustration of the manner in which a single spacecraft may be caused to orbit about the earth in a quasi sun-oriented flight mode.

DETAILED DESCRIPTION OF THE PREFERRED EMBODIMENT

Figure 1A:
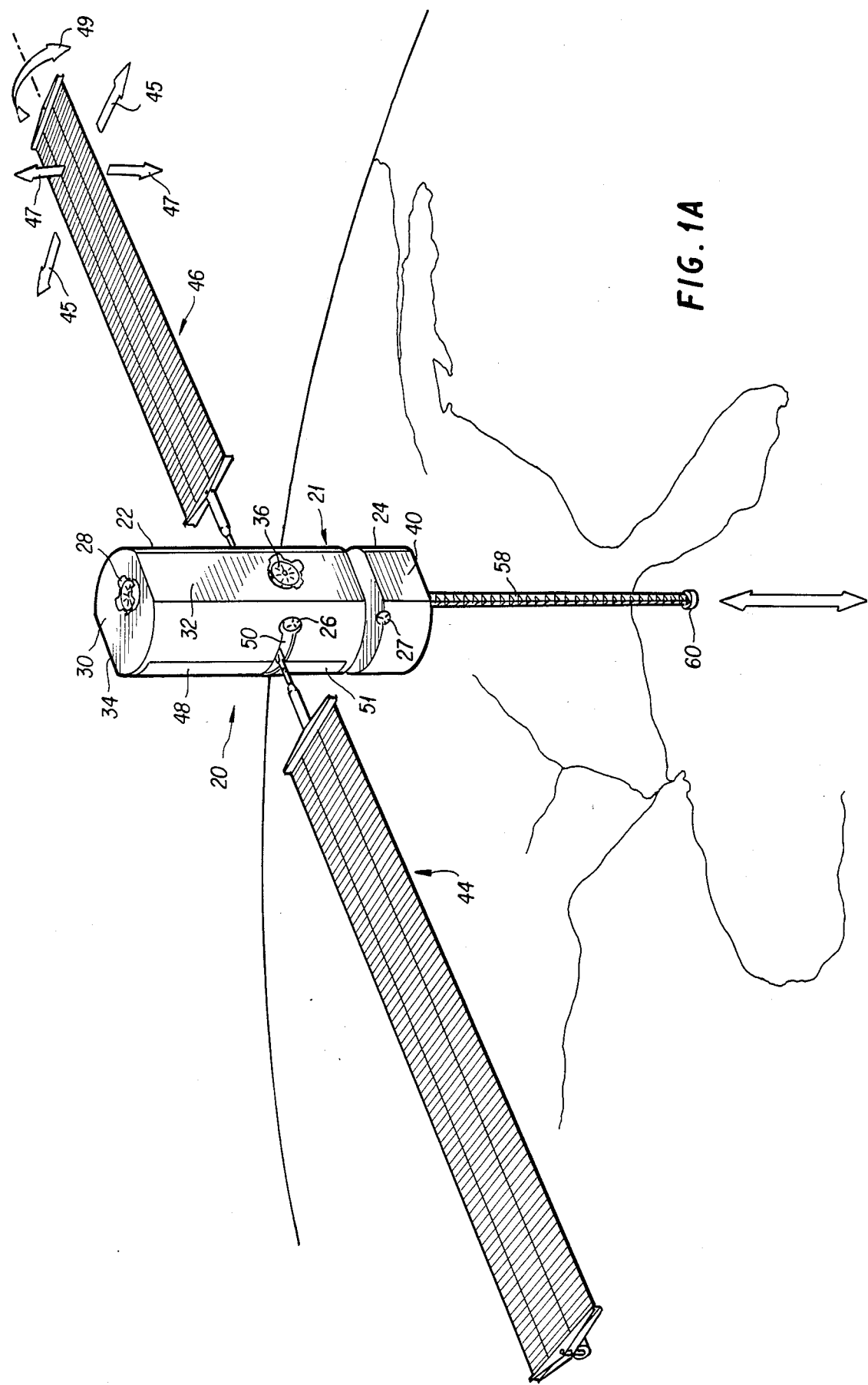
FIG. 1A is a top perspective view of a man-tended orbiting spacecraft constructed in accordance with the principles of the present invention.
Figure 1B:
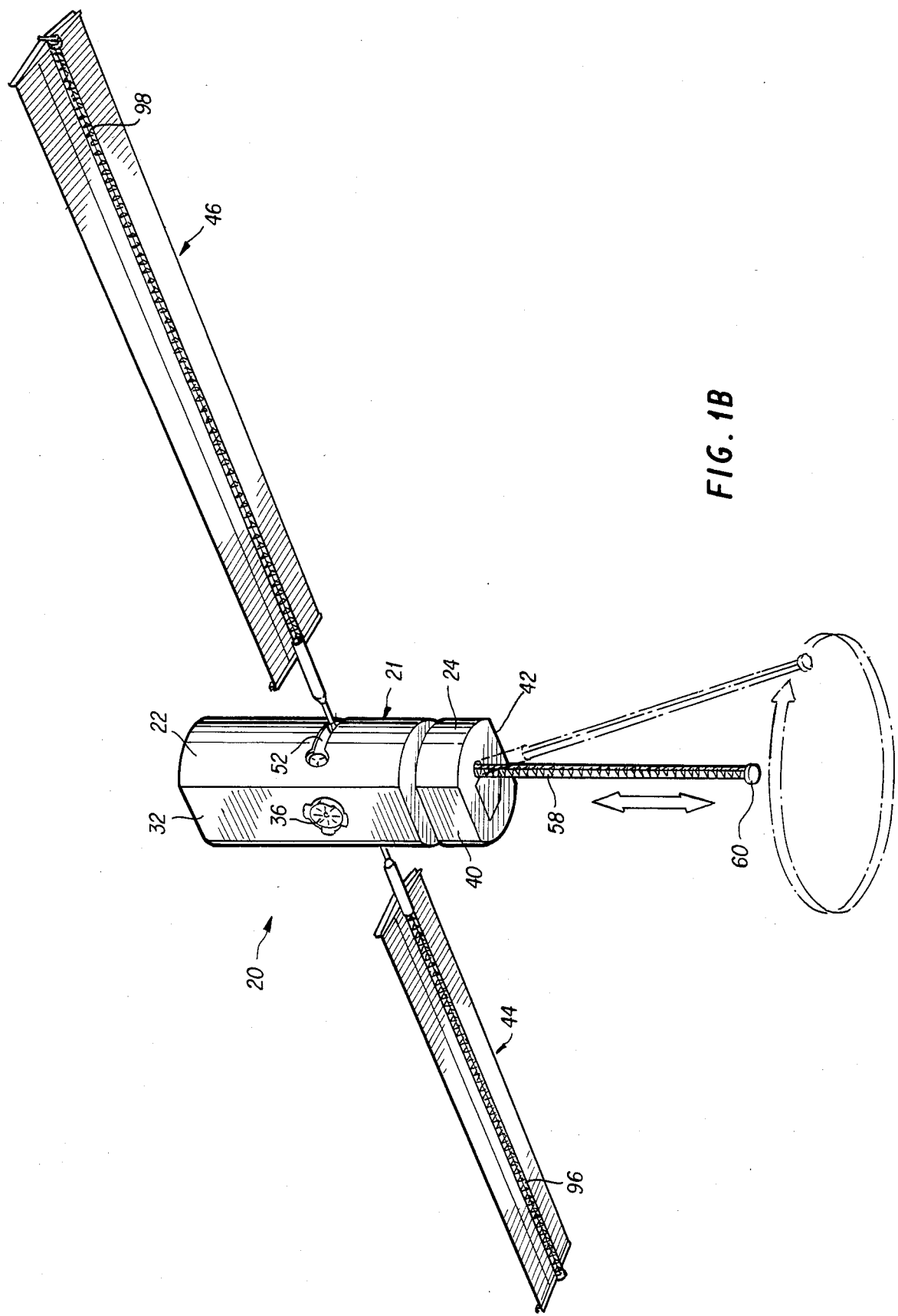
FIG. 1B is a bottom perspective view of the spacecraft, illustrating the articulation of the gravity gradient boom.

FIGS. 1A and 1B illustrate a spacecraft 20 which is constructed in accordance with the principles of the present invention. The spacecraft 20 may be of any desired type, but in the preferred embodiment it comprises a man-tended space platform which is usable for industrial or research purposes. To this end, the spacecraft body 21 comprises two generally cylindrical sections 22 and 24, the upper section 22 being referred to as the facility module and the lower section 24 being referred to as the supply or logistics module. The facility module 22 is a permanent module containing equipment and payloads appropriate to the spacecraft mission. By way of example, the payloads may be adapted to carry out materials processing operations, new product development, or life sciences research. A particularly important type of materials processing, referred to as electrophoresis operations in space (EOS), can be used for the purification of pharmaceutical and biological products. Other commercially valuable processes include the production of monodisperse latex spheres for medical applications, growth of large ultra-pure semiconductor crystals, containerless processing of fiber-optic glasses, and creation of exotic metal alloys and other composites which cannot be produced in a gravity environment. The facility module payloads can be configured as "factories" for carrying out one or more of these processes automatically and without human supervision. In addition to the payloads themselves, the facility module 22 also carries the necessary equipment to support the payloads, such as fluid tanks, pumps, batteries, power conditioning equipment, heat exchangers, and so on. The supply module 24 is a temporary or exchangeable module which provides logistic support for the facility module 22 and its payloads. In the case of an electrophoresis payload, for example, the supply module 24 is fitted with EOS media tanks, EOS product tanks, nitrogen tanks to support the EOS process, and associated plumbing lines and cooling equipment.

The spacecraft 20 shown in FIGS. 1A and 1B is intended to be placed in near circular earth orbit by means of a single, dedicated launch of the NASA Space Shuttle. The facility module 22 and supply module 24 are dimensioned to fit in the cargo bay of the Shuttle vehicle, and the outer hulls of both modules are provided with grapple fittings 26, 27 which can be engaged by the remote manipulator system (RMS) of the Shuttle to allow orbital emplacement and recapture. The spacecraft 20 is not permanently manned, but includes pressurization and life support equipment suitable for shirt-sleeve operation when berthed to the Shuttle. A berthing mechanism 28 is provided in the flat upper face 30 of the facility module 22 to allow access by the Shuttle crew. The berthing mechanism 28 is engageable with a berthing adapter carried in the cargo bay of the Shuttle vehicle. The spacecraft 20 and its materials processing equipment are put into automated operation before being left in orbit by the Shuttle crew. The Shuttle returns as necessary (i.e., about once every three months) with a new supply module to resupply the spacecraft payloads and the operational needs of the spacecraft, and to harvest the products manufactured. During these visits, the Shuttle crew occupy the spacecrafts 20, but are sustained principally by the Shuttle. Resupply of the spacecraft and its materials processing equipment is through exchange of a fresh supply module for a depleted supply module, achieved by means of the Shuttle RMS.

The spacecraft 20 is designed to allow modular expansion by adding additional facility modules 22 and supply modules 24 in a side-by-side arrangement. This is achieved by using the shuttle RMS to capture a spacecraft which is already in orbit, and then coupling the captured spacecraft to a second spacecraft carried in the Shuttle cargo bay. The use of two or more coupled spacecraft allows a multiplication in the capability for materials processing. The side-to-side coupling between spacecraft is facilitated by forming the outer shell of the facility module 22 with diametrically opposed flattened or planar sections 32, 34 which extend along the length of the module. Berthing mechanisms 36, 38 are provided in these flattened or planar sections of the facility module hull. (Berthing mechanism 38 is not visible in FIGS. 1A and 1B but can be seen in FIG. 2A.) Similar flattened sections 40, 42 are formed at diametrically opposed locations on the outer hull of the supply module 24, and these flattened sections are in alignment with the flattened sections 32, 34 of the facility module hull as shown. Further details concerning the module expansion feature of the spacecraft 20 may be found in the copending U.S. patent application of Maxime A. Faget, Caldwell C. Johnson and David J. Bergeron III, filed on Mar. 20, 1985 under Ser. No. 713,817 and entitled "Modular Spacecraft System", which application is incorporated by reference herein.

With continued reference to FIGS. 1A and 1B, the facility module 22 carries a pair of articulated solar arrays 44, 46 which generate the electrical power required by the spacecraft 20. Electrical power is required principally for the materials processing payloads carried aboard the facility module 22, but also to some extent for guidance, navigation and attitude control functions, for data management, for environmental and thermal control, and for tracking, telemetry and related control functions. In their stowed positions, the solar arrays 44, 46 are housed behind a pair of swing-out doors in the upper portion of the facility module 22, one of these doors 48 being partially visible in FIG. 1A. The solar arrays 44, 46 extend outwardly from opposite sides of the facility module 22 when deployed, and are joined to the facility module by a number of gimbals (shown in FIG. 2A) which permit the arrays to be rotated independently about three mutually orthogonal axes. These independent rotations are illustrated by the arrows 45, 47, 49 in FIG. 1A and are referred to as gamma, alpha, and beta rotations, respectively. The gamma rotation, represented by the arrows 45, occurs about a first axis which is parallel to the longitudinal axis of the spacecraft body 21. The alpha rotation, represented by the arrows 47, occurs about a second axis which is perpendicular to the first axis. The beta rotation, represented by the arrow 49, occurs about a third axis which is perpendicular to the second axis and parallel to the longitudinal axis of the solar array. These rotations are used to allow initial deployment of the solar arrays 44, 46 from their stowed positions within the facility module 22. In addition, periodic beta rotations are used for solar tracking, that is, for maintaining a sun-facing orientation of the solar arrays during orbital flight of the spacecraft. In principle, alpha rotations could also be used for the solar tracking function, but this is only necessary if maximum power must be generated from the arrays. As a further possibility, rotation of the solar arrays about their inner gimbals can be employed to change the relative values of $I_{xx}$, $I_{yy}$ and $I_{zz}$, thereby affecting the gravity gradient stability of the spacecraft.

The first gimbal of each solar array, which permits the gamma rotation, is mounted inboard relative to the second and third gimbals and is affixed to an inner pressure hull (not shown in FIGS. 1A and 1B) which is supported in an eccentric position within the outer shell of the facility module 22. Since the first gimbal is physically positioned within the gap or space between the inner hull and outer shell, a pair of horizontal slots 50, 52 are formed in the outer shell of the facility module 22 in order to allow gamma rotation of the arrays 44, 46 to occur without interference from the outer shell. The second gimbal, permitting the alpha rotation, is located outboard relative to the first gimbal and inboard relative to the third gimbal, which allows the beta rotation. The second gimbal is external to the outer shell of the facility module when the array is fully deployed, and for that reason a separate vertical slot is not needed in the outer shell to allow alpha rotations to occur. The third gimbal is located outboard relative to the second gimbal and is also external to the outer shell of the facility module when the arrays are fully deployed as shown. The actuators for the three gimbals are driven by electric motors and provision is made for indicating the rotational position of each gimbal for control purposes.

The spacecraft includes active and passive attitude control means to permit orbital flight in two alternative modes. In the preferred embodiment, the active control means comprises a pair of double-gimbal control movement gyroscopes (indicated at 69 and 71 in FIGS. 2A and 2C) to enable three-axis control. The control moment gyroscopes may be Model M325 double-gimbal units which are available from the Sperry Flight Systems division of Sperry Corporation, located in Phoenix, Ariz. Other types of active attitude control devices which can be used include momentum wheels and magnetic torquers. The passive attitude control means comprises a gravity gradient stabilization device in the form of an elongated boom 58. The boom 58 is of the coilable type and is carried by the supply module 24. A heavy mass 60 is attached to the lower end of the boom 58 in order to enhance the gravity gradient effect. In the preferred embodiment, the fully extended length of the gravity gradient boom 58 is about 100 feet, and the mass 60 comprises a 200-pound lead disk. By comparison, the combined length of the facility module 22 and supply module 24 is about 46.5 feet and the diameter of each module is about 14.5 feet. The combined weights of the facility module 22 and supply module 24 is about 36,000 pounds.

In addition to the active and passive attitude control means, the spacecraft 20 is provided with a number of cold gas thrusters (not shown) positioned at various locations on the surface of the facility module 22 and supply module 24. The cold gas thrusters are used for orbit-keeping and for maneuvering the spacecraft 20 during berthing with the Shuttle vehicle or with other spacecraft.

The gravity gradient boom 58 is extendible from and retractable into the supply module 24 and can be controlled in a variable or continuous manner so as to be capable of any desired degree of extension or retraction. With the boom 58 extended, the spacecraft 20 can be stabilized in an earth-oriented flight mode. In this orientation, the boom 58 may be directed either toward or away from the earth, although in the usual case it will be directed toward the earth. The earth-oriented flight mode provides the spacecraft with a stable attitude and requires only a minimum amount of active attitude control and orbit-keeping. With the boom 58 partially or completely retracted, the spacecraft can be stabilized in a quasi sun-oriented flight mode (i.e., with the same side always facing toward the sun) through the use of the active attitude control means. This flight mode is preferred when it is desired to obtain maximum power from the solar arrays 44, 46 for use by the materials processing payloads of the facility module 22, since in this orientation the arrays can be made to face directly toward the sun at all points in the sunlit portion of the spacecraft orbit.

The gravity gradient boom 58 may be partially extended during quasi sun-oriented orbital flight in order to cause the two orbital-plane moments of inertia of the spacecraft 20 to be made substantially equal. This allows the spacecraft to be made neutrally stable in the orbital plane, and thus requires a minimum amount of active attitude control to maintain the spacecraft in the desired orientation. Such a capability is particularly desirable in the case of a spacecraft 20 of the type described herein, in which different types of supply modules 24 will be used to support different types of materials processing payloads in the facility module 22. The supply modules may have different sizes and masses and may therefore have the effect of changing the moments of inertia of the spacecraft 20. In addition, continual movement of fluids between the supply module 24 and facility module 22 will occur as a consequence of the materials processing operations carried out in the facility module payloads. This will cause a continual redistribution of mass within the spacecraft and hence a gradual change in the moments of inertia of the spacecraft. These effects can be counteracted by extending or retracting the boom 58 to the degree necessary to equalize the moments of inertia in the orbital plane and hence maintain neutral stability of the spacecraft. Preferably, the spacecraft 20 is designed so that in its nominal or baseline configuration it is neutrally stable when the gravity gradient boom 58 is extended by a certain fraction of its full length. In this way, the boom can be adjusted in two directions (i.e., by further extension or further retraction) to achieve neutral stability of the spacecraft when the distribution of mass changes due to the factors mentioned above.

Varying the length of the boom 58 may also be used to adjust the natural frequency of the spacecraft to avoid or enhance oscillatory response. The spacecraft 20 will experience torques due to aerodynamic imbalances and other factors. These imbalances will vary, generally as some function of the orbital period. The natural frequency of the spacecraft will affect its response to the torques created by these imbalances. By changing the length of the gravity gradient boom 58, the natural frequency of the spacecraft may be set at a value such that the spacecraft oscillations are minimized. Alternatively, it may be desired to enhance oscillatory response in certain situations, and this may also be accomplished by adjusting the length of the boom 58. As an example, it might be desired to induce an oscillation of the spacecraft 20 which is related to the orbital period in a manner such that solar tracking is carried out automatically, with little or no exercise of active attitude control.

Figure 2A:
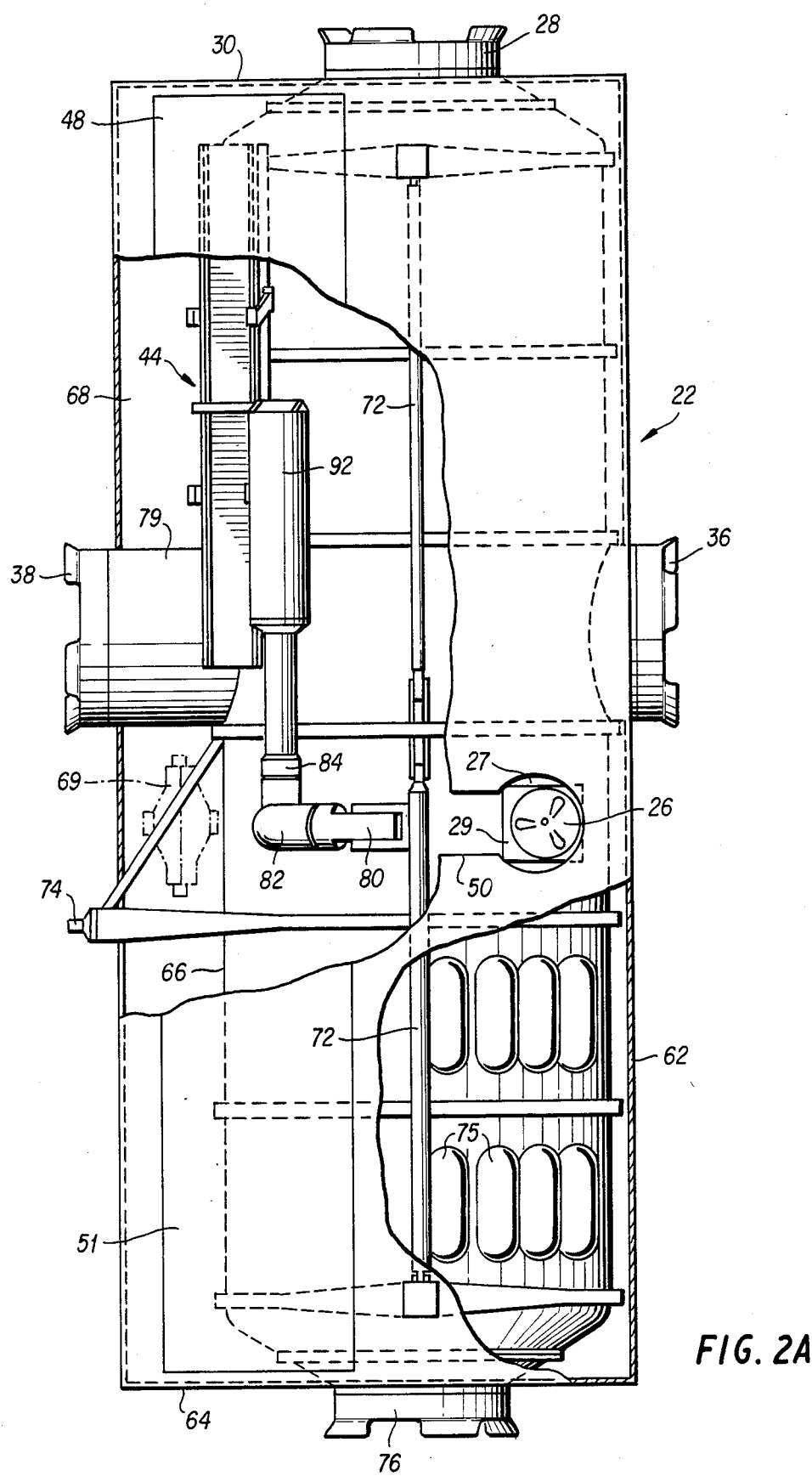
FIG. 2A is a side elevational view of the facility module which constitutes the upper section of the spacecraft body.
Figure 2B:
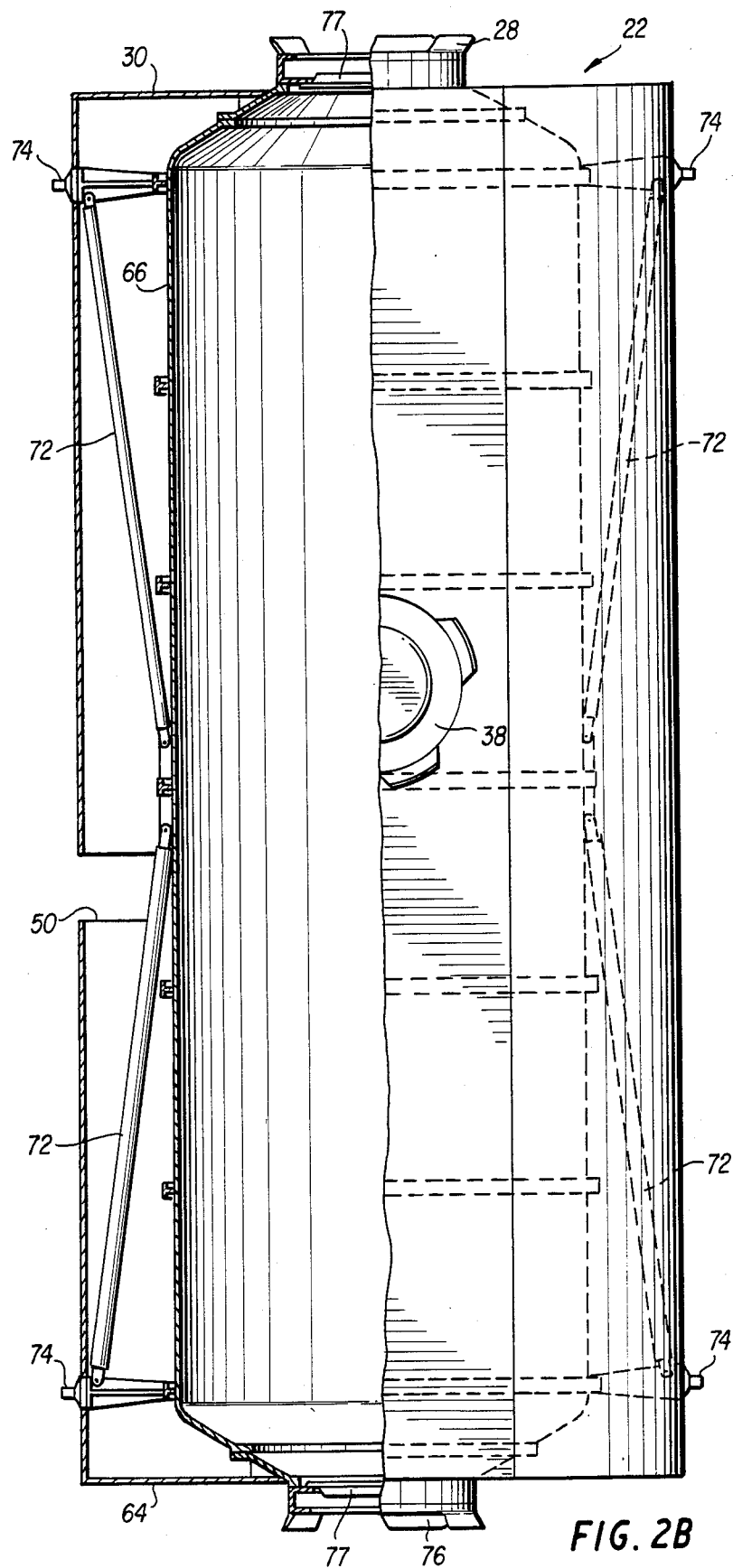
FIG. 2B is a partial side sectional view of the facility module taken from another angle.
Figure 2C:
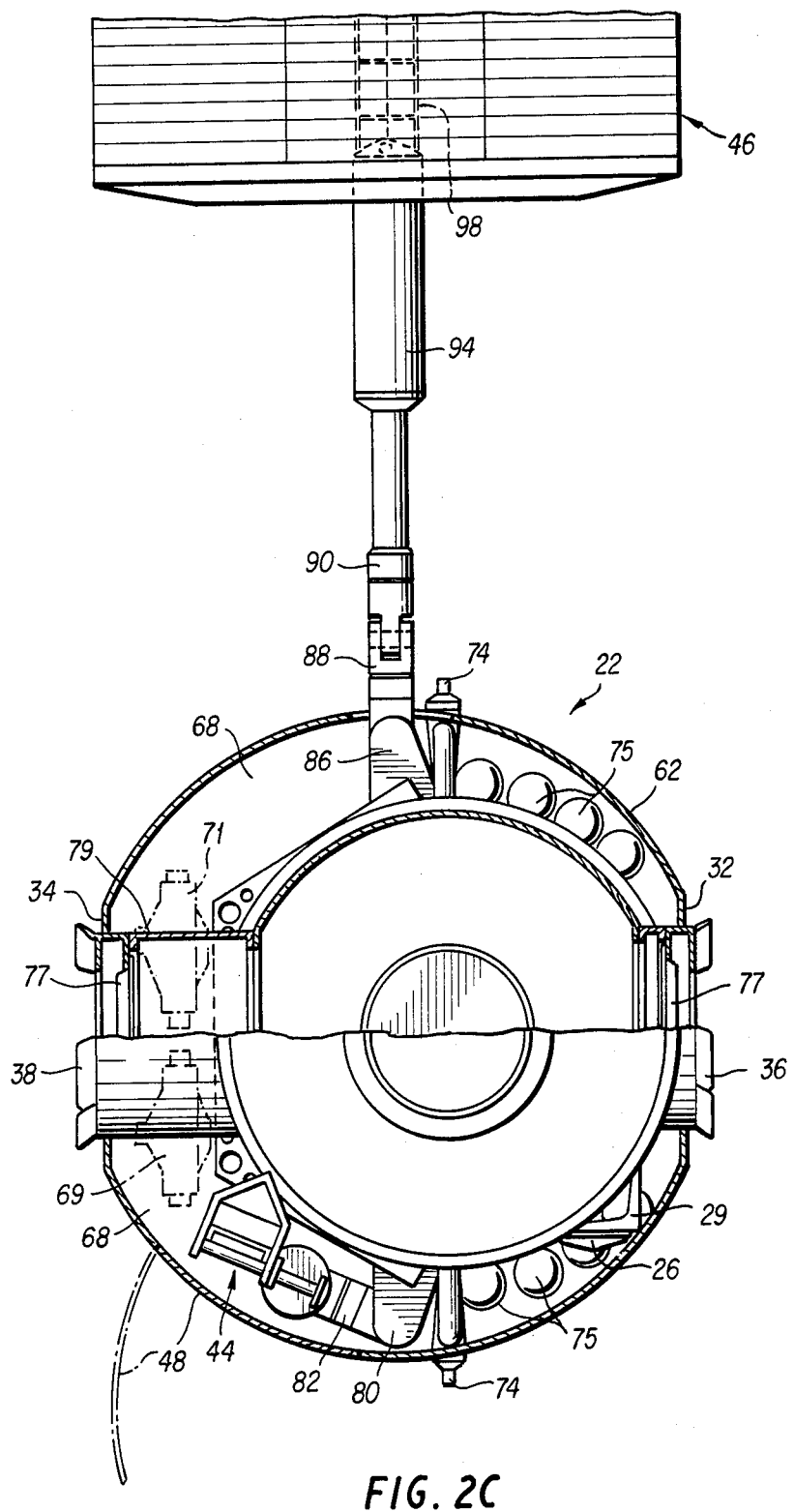
FIG. 2C is a top sectional view of the facility module, with one solar array shown in the stowed position and the other solar array shown in the fully deployed position.

The details of the facility module 22 are illustrated in FIGS. 2A, 2B and 2C. The outer shell 62 of the facility module is generally cylindrical in shape with planar or flattened portions 32, 34 extending vertically on each side as described previously. The outer shell 62 serves as a thermal and meteorite shield for the facility module and also contains integral coolant passages and manifolds allowing it to serve as a heat radiator for dissipating heat generated by the operation of the facility module and its payloads. The radiator skin is preferably pierced by a regular pattern of holes (not shown) to allow temporary or permanent attachment of mobility and restraint aids or external apertenances during extra-vehicular activity (EVA) by the Shuttle crew. The underside of the radiator may be lined with a multi-layer thermal insulation. The upper and lower ends 30, 64 of the outer shell do not serve as heat radiators but comprise discrete thermal and meteorite shields for protection of the ends of the facility module 22. The primary structure of the facility module consists of an inner pressure hull 66, which is generally cylindrical in shape and is supported within the outer shell 62. As can be seen most clearly in FIG. 2C, the vertical or longitudinal axes of the inner hull 66 and outer shell 62 are offset from each other, with the result that the inner pressure hull 62 is mounted eccentrically within the outer shell 62. This provides an external payload area 68 in the region between the inner hull 66 and outer shell 62. The external payload area 68 carries the stowed solar arrays 44, 46, the control moment gyroscopes 69, 71 that are used for active control of the spacecraft attitude, and other payload support equipment (not shown) such as batteries and power conditioning equipment, fluid tanks, heat exchangers, and so on. The upper door 48 communicates with the upper part of the external payload area 68 on one side of the facility module to allow deployment of the solar array 44. A lower door 51 serves as a continuation of the upper door 48 below the slot 50, and allows access to the lower part of the external payload area. An identical set of upper and lower doors is provided on the opposite side of the facility module where the second solar array 46 is mounted. The inner pressure hull 66 is an airtight structure made of welded aluminum alloy plate with frames and stiffeners fabricated from rolled plate. A number of air tanks 75 are affixed around the inner pressure hull 66 to provide propulsion and pressurization of the spacecraft interior. A number of internal structural elements 72 provide a supporting framework for the inner pressure hull 66 and also provide connection to the outer shell 62. The structural elements 72 also carry trunnions 74 which allow the facility module 22 to be mounted in the Shuttle cargo bay.

The inner pressure hull 66 contains the various materials processing payloads which are carried by the facility module 24. In the case of an electrophoresis payload, the EOS "factory" is mounted in the pressure hull 66 of the facility module, while the various storage tanks for EOS media, product and pressurization gas are mounted in the supply module 24. The plumbing between the facility and supply modules must be disconnected and reconnected during each supply module changeout. In addition to the materials processing payloads themselves, the interior of the pressure hull 66 is fitted with floors, walls, and ceilings to cover and protect equipment mounted against the pressure hull, and also with mobility and restraint devices such as handholds and footholds built into the floors and walls. The interior of the pressure hull 66 is also provided with suitable equipment supports to allow mounting of the materials processing payloads, and with cabinets and lockers for use by the Shuttle crew during maintenance and supply module changeout.

The facility module 22 is provided with a number of berthing mechanisms 28, 36, 38 and 76. Each berthing mechanism includes a hatch closure 77 with a viewport and each communicates with the interior of the inner pressure hull 66. The upper berthing mechanism 28 is used for berthing with a berthing adapter in the Shuttle cargo bay, and allows the Shuttle crew to enter the facility module 22 in order to service the payloads carried within the inner pressure hull 66. The lower berthing mechanism 76 allows the facility module 22 to be connected to a supply module 24 as illustrated in FIGS. 1A and 1B. The berthing mechanisms 36, 38 on the planar side areas 32, 34 of the facility module allow the facility module 22 to be joined to other substantially identical facility modules in a side-by-side arrangement to create a modular spacecraft as described earlier. Due to the eccentric mounting of the inner pressure hull 66 with respect to the outer shell 62, the berthing mechanism 38 communicates with the interior of the inner pressure hull through a short tunnel or passage 79. Terminals for manually connecting fluid and electrical jumper lines between adjacent facility modules, or between a facility module and a supply module, are located in the vestibule areas between berthing mechanisms.

The facility module 22 is provided with a pair of grapple fittings 26, one being visible in FIGS. 2A and 2C, to enable the Shuttle RMS to remove the facility module from the cargo bay during initial activation, and to reacquire the facility for reberthing the Shuttle. The grapple fittings are recessed in apertures 27 formed in the outer shell 62 and are supported by mountings 29 which provide thermal insulation from the inner pressure hull 66.

The solar array 44 is shown in its stowed position in FIGS. 2A-2C, while the array 46 is shown in the fully deployed position. This is done for the purpose of illustration only, it being understood that both arrays will normally be in the same condition (i.e., either stowed or deployed) in the actual spacecraft. In the stowed position, used when the spacecraft 20 is being carried in the Shuttle cargo bay prior to initial activation, the arrays are housed within the external payload area 68 between the inner hull 66 and outer shell 62 as described previously. The array 44 is joined to one side of the inner pressure hull 66 by a series of connected gimbals consisting of a first or inboard gimbal 80, a second or central gimbal 82, and a third or outboard gimbal 84. The array 46 is joined to the opposite side of the inner pressure hull by an identical series of connected gimbals consisting of a first or inboard gimbal 86, a second or central gimbal 88, and a third or outboard gimbal 90. During deployment, the gimbals rotate in a prescribed order to cause the folded arrays 44, 46 to pivot out of the external payload area 68. As this occurs, the coilable masts 96, 98 (fully visible in FIG. 1B) are deployed from the canisters 92, 94 in which they are stowed, causing the arrays 44, 46 to unfurl in an accordian-like manner to their full length. Once deployed, the arrays 44, 46 are supported by the masts 96, 98 and may be periodically rotated about their longitudinal axes by the outboard gimbals 84, 90 to achieve solar tracking. The arrays 44, 46 may also be rotated about axes parallel to the longitudinal axis of the spacecraft body 21 by the inboard gimbals 80, 86 to provide adequate clearance between adjacent panels when several facility modules 22 are connected together to create a modular spacecraft system. Further details of the solar arrays 44, 46 and the array deployment sequence may be found in the copending U.S. patent application of Caldwell C. Johnson, Maxime A. Faget and David J. Bergeron III, filed on Mar. 20, 1985 under Ser. No. 713,882 and entitled "Spacecraft with Articulated Solar Array and Method for Array Deployment", which application is incorporated by reference herein.

Figure 3A:
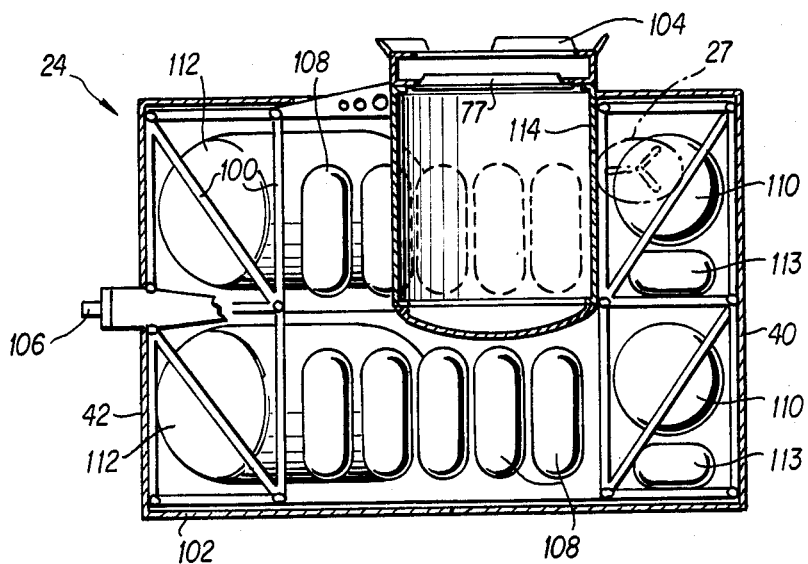
FIG. 3A is a side sectional view of the supply module which constitutes the lower section of the spacecraft body.
Figure 3B:
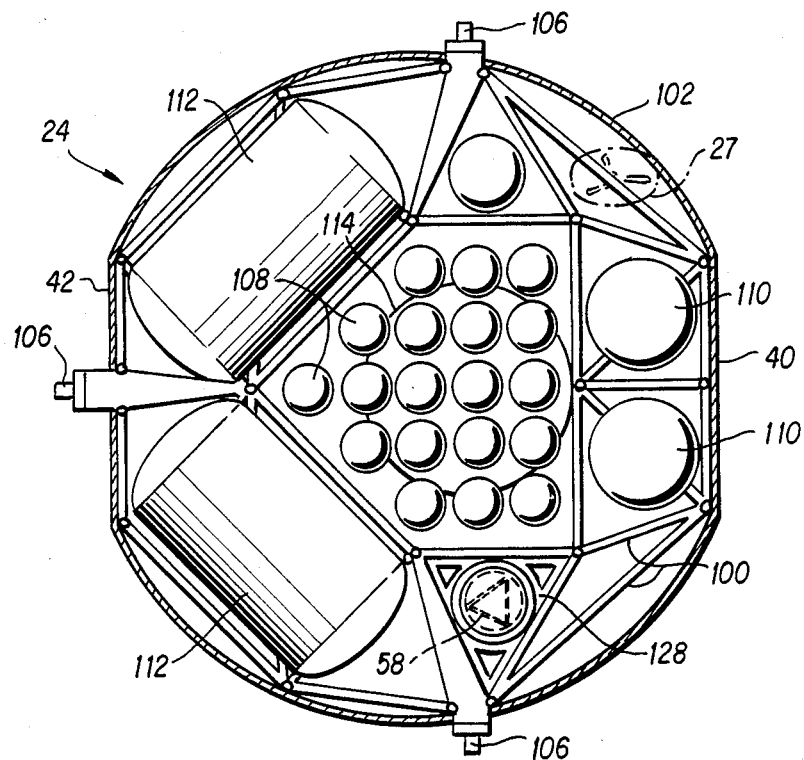
FIG. 3B is a bottom sectional view of the supply module.

FIGS. 3A and 3B illustrate the details of the supply module 24. The function of the supply module is to carry expendables and some equipment required for operation of the spacecraft 20, and virtually all of the expendables required by the facility module payloads. The supply module 24 includes an inner spaceframe 100 which is fabricated from aluminum alloy weldments and extrusions. The spaceframe 100 supports a thermal and meteoroid shield 102 comprising removable panels which surround the entire module 24, except in the areas over the berthing mechanism 104 and the opening (not shown) for the gravity gradient boom 58. If desired, the outer shield 102 may incorporate a heat radiator to augment the cooling system of the facility module 22. Protruding from the outer shield 102 and affixed to the spaceframe 100 are a number of trunnions 106 which are used for securing the supply module in the cargo bay of the Shuttle vehicle.

The interior of the supply module 24 contains a number of air storage tanks 108 which are used for propulsion and to provide a pressurized environment in the spacecraft. The supply module also contains a number of fluid storage tanks to support the materials processing operations carried out in the facility module 22. In the exemplary case of an electrophoresis (EOS) payload, a number of product tanks 110 are located in one side of the supply module so as to be accessible when the module is in the Shuttle cargo bay. A number of larger tanks 112 are also provided in the supply module for containing the EOS media. The tanks 111, 112 are well insulated with minimum thermal shorts to the supply module structure, and are preferably provided with active cooling means (not shown) to maintain the EOS product and media at the proper temperature. In addition to the EOS product and media tanks 110, 112, the supply module 24 contains a number of nitrogen tanks 113 to support the EOS process.

The interior of the supply module 24 includes a small pressurizable chamber 114 that communicates with the berthing mechanism 104 so as to be accessible from the interior of the facility module 22 when the two modules are coupled together. The berthing mechanism 104 of the supply module 24 connects to the lower berthing mechanism 76 of the facility module 22, and fluid and electrical connections between the two modules are made by manually connected jumper lines (not shown). The pressurizable chamber 114 facilitates the manual connection of these lines by the Shuttle crew. The grapple fitting 27 allows the supply module 24 to be engaged by the Shuttle RMS and is mounted in a recessed position with respect to the outer shell 102 of the supply module, similar to the manner in which the grapple fittings 26 of the facility module 22 are installed.

Figure 4A:
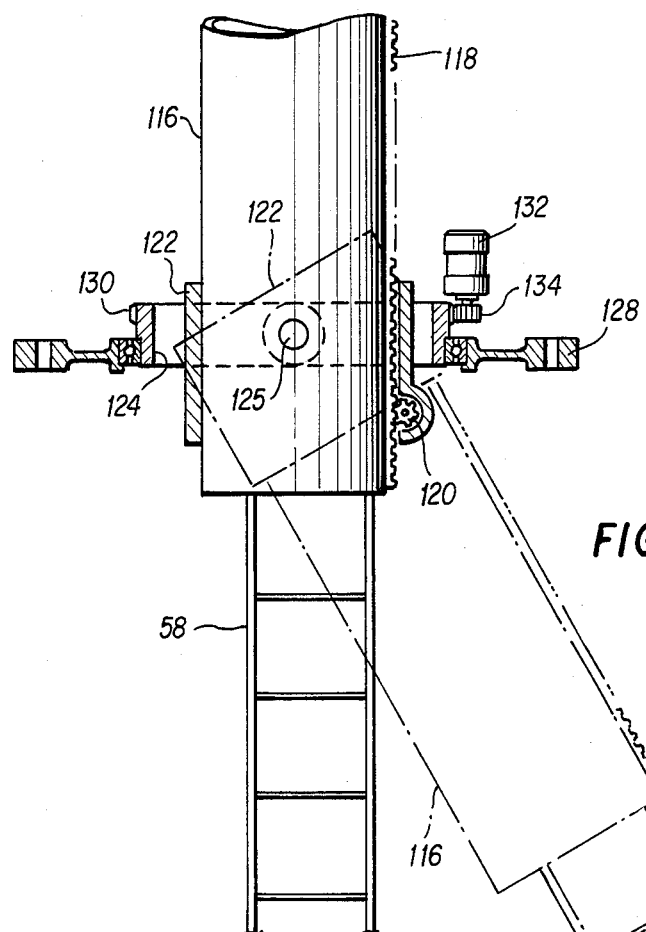
FIG. 4A is a side sectional view of the mechanism used to control the angle at which the gravity graident boom extends from the bottom of the supply module.
Figure 4B:
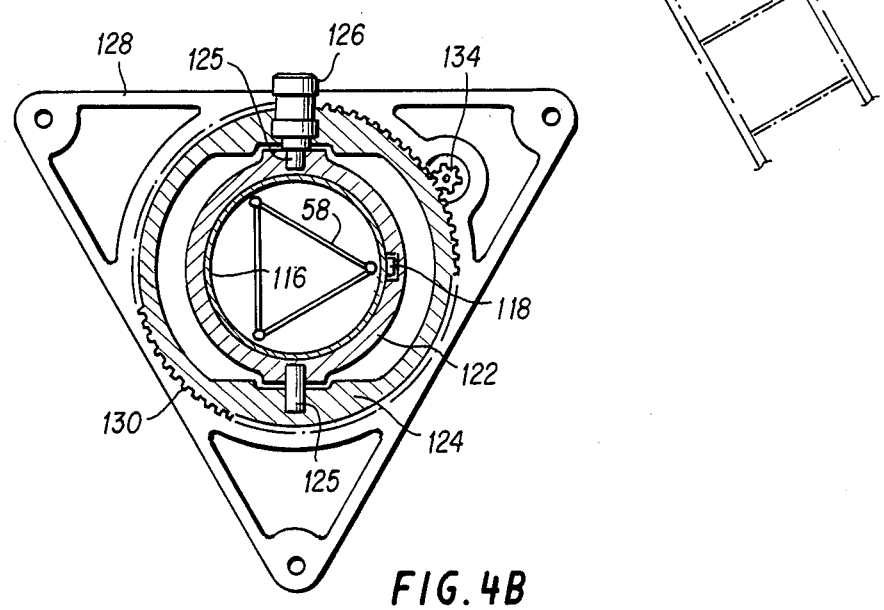
FIG. 4B is a bottom sectional view of the mechanism of FIG. 4A.

The mechanism used for deploying and articulating the gravity gradient boom 58 is illustrated in FIGS. 4A and 4B. The gravity gradient boom 58 is a deployable or coilable lattice-type column structure which is stored in a cylindrical canister 116 prior to deployment. Structures of this type are known from U.S. Pat. No. 3,486,279, to J. A. Webb, and from U.S. Pat. No. 4,334,391, to J. M. Hedgepeth et al., both of these patents being incorporated herein by reference. Commercial sources for deployable lattice columns are Astro Research Corporation of Carpinteria, Calif., and AEC-ABLE Engineering Company, Inc., of Goleta, Calif. These structures are self-deploying by virtue of the potential energy stored in the collapsed longerons, which are bent in a circular shape while inside the storage canister. A known mechanism, not shown, allows the boom 58 to be deployed at a controlled rate and also allows the boom to be collapsed and retracted back into the canister 116 after it has been deployed. This mechanism operates in a variable or continuous manner so that the boom 58 is capable of any desired degree of extension or retraction.

For the purposes of the present invention, it is preferable that the boom 58 be capable not only of variable amounts of extension and retraction but also of angular adjustment relative to the vertical axis of the spacecraft 20. To this end, the canister 116 is fitted with a rack 118 which is engaged by a motor-driven pinion 120 in order to slide the canister vertically within a sleeve 122. The sleeve 122 pivots within a gimbal 124 by means of pins 125 and has its pivot angle controlled by a motorized actuator 126. The gimbal 124 is rotatable within a frame 128 and is formed with gear teeth 130 so that its rotation can be controlled by a motorized actuator 132 and pinion 134. The frame 128 is mounted in the bottom area of the supply module 24, as illustrated in FIG. 3B, so that the canister 116 can be retracted into the interior of the supply module. In operation, the gravity gradient boom 58 is deployed from the canister 116 in the usual manner, with the canister either retracted into or extended from the supply module. If angular articulation of the boom is desired, the canister must be moved downward to its fully extended position by operating the rack and pinion arrangement 118, 120. The boom may then be pivoted to a desired angle with respect to the vertical by means of the gimbal 124 and actuator 126, which cause the sleeve 122 and canister 116 to tilt as a unit. Simultaneously or separately, the boom may be indexed or rotated in a circular pattern by means of the actuator 132 and pinion 134, which cause the sleeve 122 and canister to rotate about a vertical axis within the frame 128. Thus it may be appreciated that by combining a pivoting movement of the sleeve 122 with a rotating movement of the gimbal 124, any desired angular orientation of the boom 58 is obtainable, subject only to the limits of pivoting of the sleeve 122 within the gimbal 124. As an example, a 30° range of pivoting of the sleeve 122 with respect to a vertical axis will allow the boom 58 to assume any angular orientation within a 60° cone having its apex within the sleeve 122.

Figure 5:
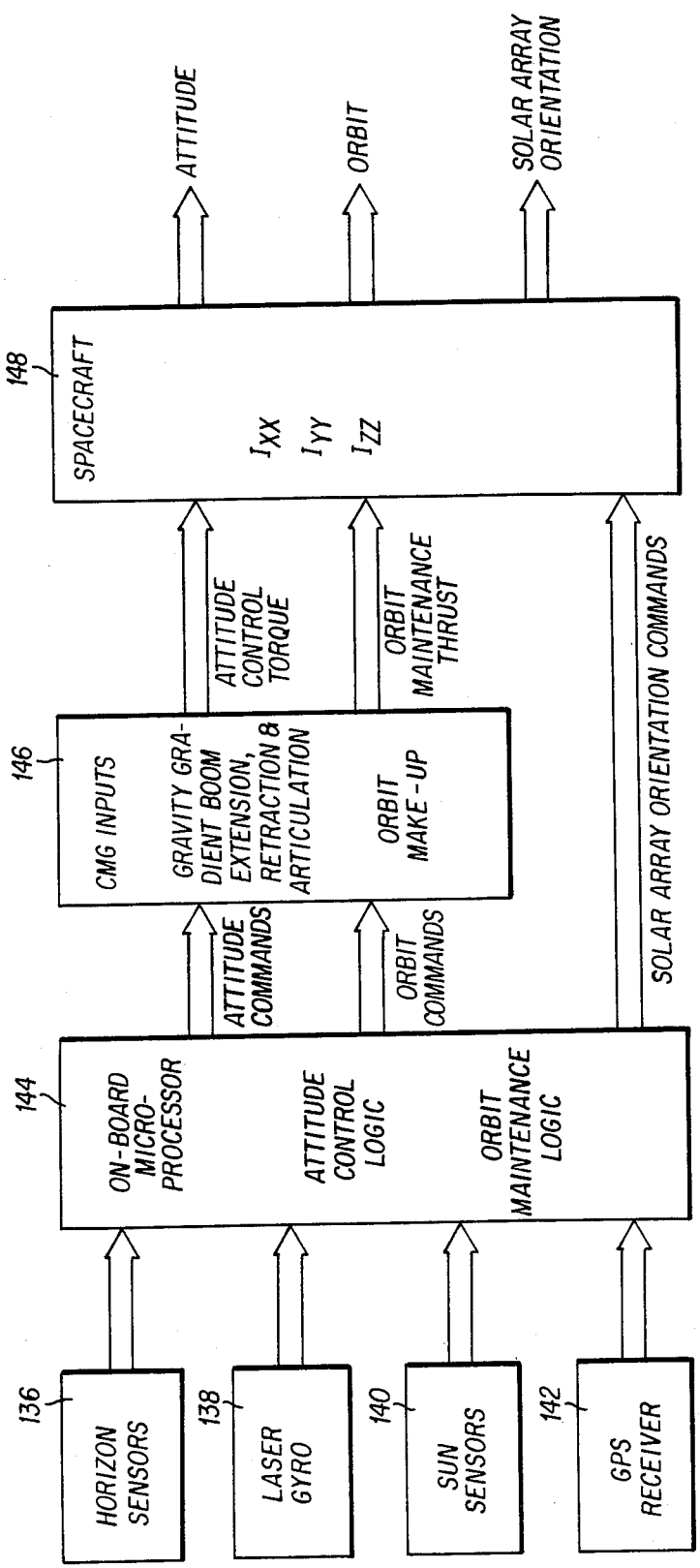
FIG. 5 is a block diagram of the control system used for stabilizing the spacecraft in a desired orbital flight mode.

FIG. 5 is a block diagram of the guidance, navigation and control system for the spacecraft 20 of FIGS. 1–4. This system is responsible for controlling the attitude of the spacecraft in the desired flight mode, compensating for orbital decay, and controlling the movements of the solar arrays. The system inputs from the external environment include horizon sensors 136, a laser gyroscope package 138, sun sensors 140, and a GPS receiver 142. The horizon sensors 136 provide long term attitude information, which is needed to periodically reset the laser gyroscope. The laser gyroscope 138 senses attitude and attitude rates for the spacecraft. The sun sensors 140 provide direct sun angle information to facilitate those operations requiring array or vehicle sun pointing. This information supplements inferred sun angle information which may be obtained from other sensors. The GPS (Global Positioning System) receiver 142 provides position and velocity information to the spacecraft 20.

The inputs from blocks 136, 138, 140 and 142 are applied to a block 144, which represents computer processing of information aboard the spacecraft. This block includes a main on-board microprocessor which compares actual spacecraft attitudes and state vectors (i.e., position and velocity) with desired parameters. If the resulting differences between the actual and desired values exceed established limits, the microprocessor computes the required corrective maneuver and generates the proper attitude and/or orbit-keeping commands. The attitude control logic, which may be implemented by a microprocessor, provides the main on-board microprocessor with attitude information and also periodically resets the laser gyroscope package based on the horizon sensor. The orbit maintenance logic, which may also be implemented by a microprocessor, determines orbit decay based on GPS data and provides this information to the main on-board microprocessor. Solar array orientation commands also originate from the on-board microprocessor, as indicated by the bottom output arrow from the block 144.

The system outputs to the external environment are represented by block 146 of FIG. 5. The attitude commands generated by the on-board microprocessor are applied to the control moment gyroscope (CMG) inputs to control the attitude of the spacecraft 20 with respect to its pitch, roll and yaw axes. The attitude commands also control the extension, retraction and angular articulation of the gravity gradient boom 58 in accordance with the desired flight mode (i.e., earth-oriented or quasi sun-oriented). The orbit-keeping commands cause the orbit make-up thrusters to turn on and off as required to correct the measured orbit decay.

Block 148 represents the spacecraft response to the outputs of block 146. The spacecraft is characterized by three moments of inertia $I_{xx}$, $I_{yy}$, and $I_{zz}$, which occur about the three orthogonal axes of the spacecraft. The relationship among these three moments of inertia depends upon the orbital flight mode of the spacecraft and can be changed to some extent by extending, retracting and/or articulating the gravity boom 58, and/or by rotating the solar arrays about their inner gimbals. The outputs from the block 148 represent the spacecraft characteristics that are controlled by the guidance, navigation and control system of FIG. 5. These include the spacecraft attitude, its orbit, and the orientation of the solar arrays 44, 46.

Figure 6A:
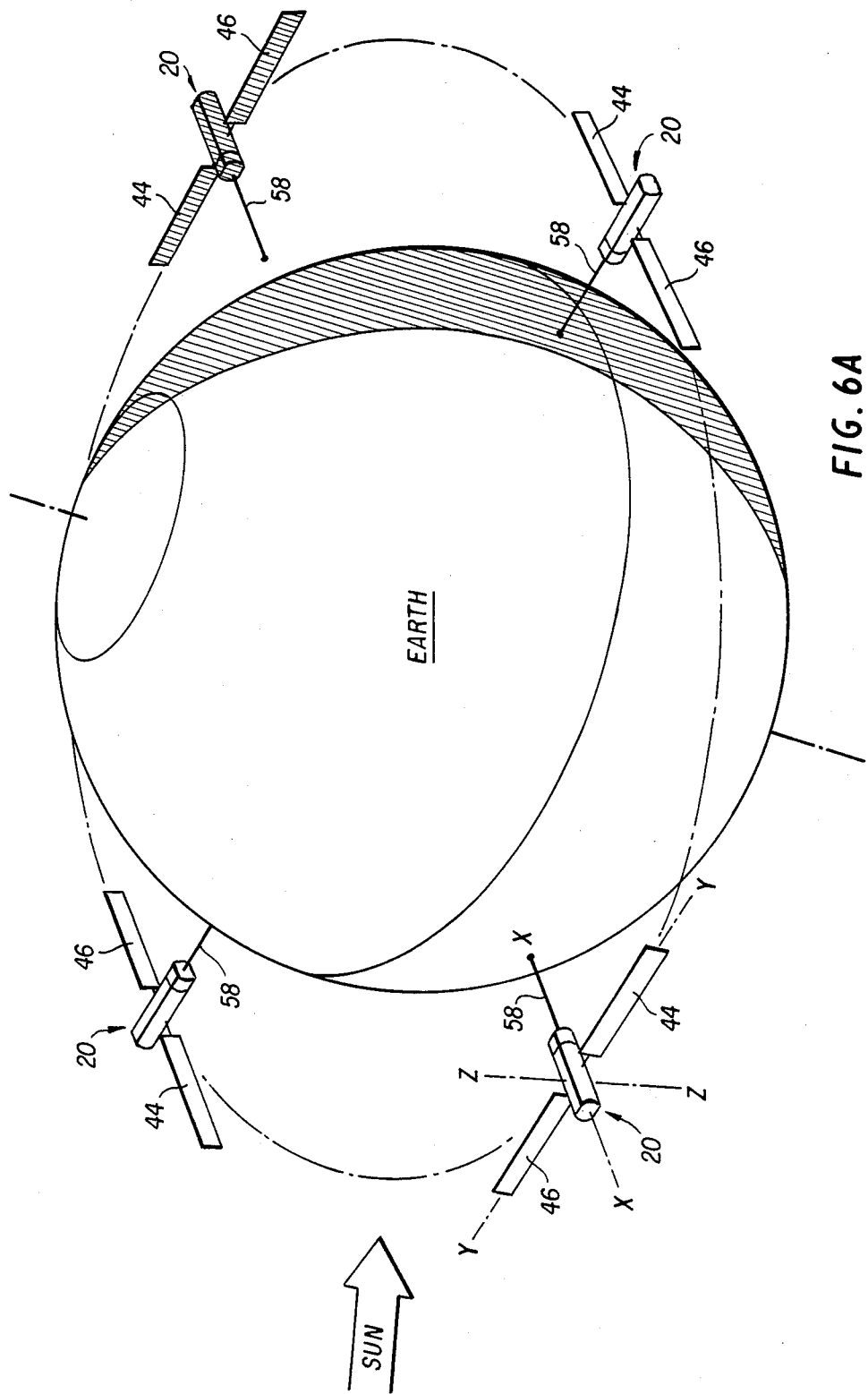
FIG. 6A is a diagrammatic illustration of the manner in which a single spacecraft may be caused to orbit about the earth in an earth-oriented flight mode.
Figure 7B:
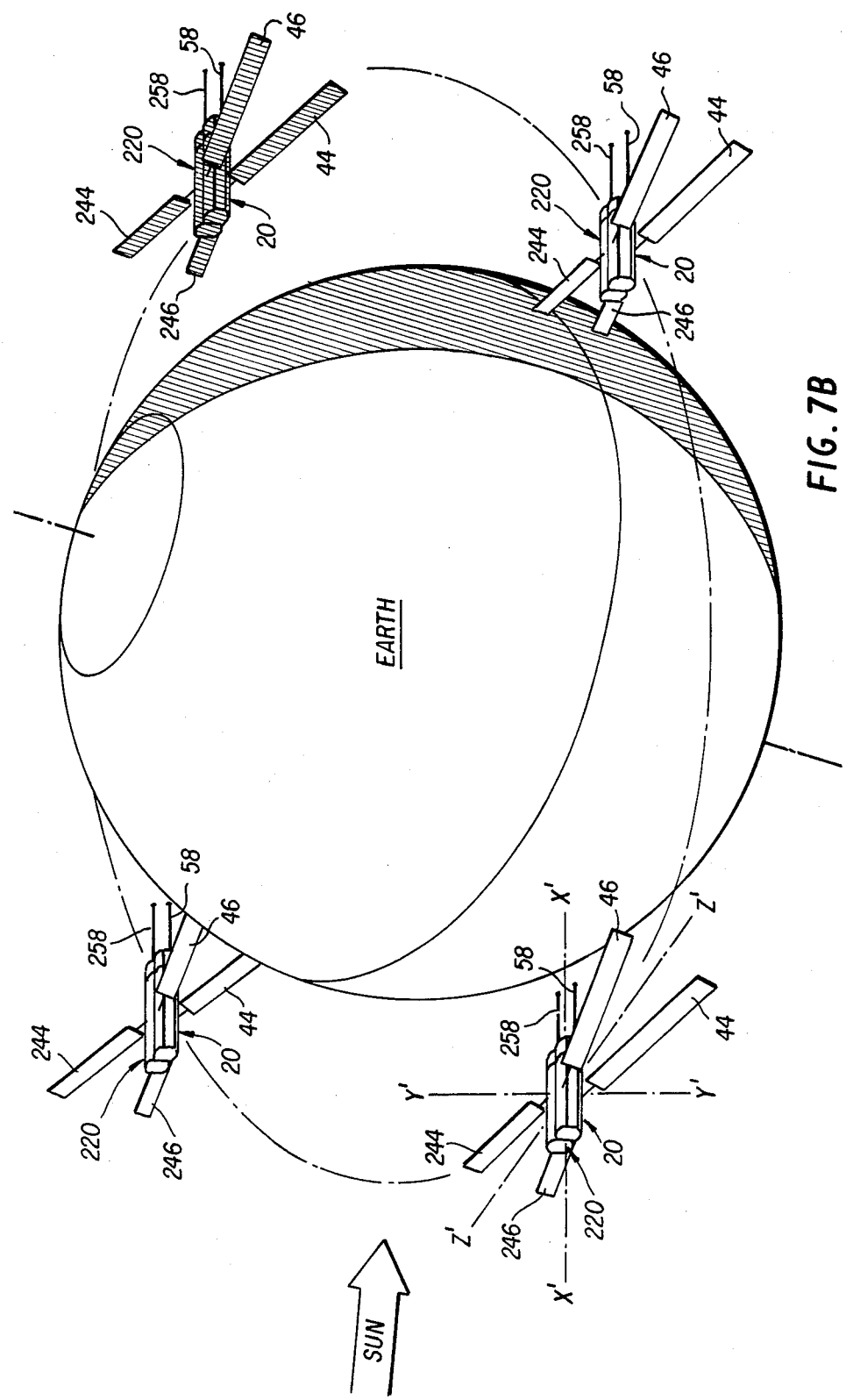
FIG. 7B is a diagrammatic illustration of the manner in which two coupled spacecraft may be caused to orbit about the earth in a quasi sun-oriented flight mode.

The present spacecraft 20 is capable of orbital flight in an earth-oriented flight mode as shown in FIGS. 6A and 6B, and in a quasi sun-oriented flight mode as shown in FIGS. 7A and 7B. In the earth-oriented flight mode, the spacecraft 20 is capable of orbital flight in two alternative attitudes. In one of these attitudes, shown in FIG. 6A, the gravity gradient boom 58 is aligned generally parallel to a first orthogonal axis of the spacecraft 20, which is substantially aligned with the local vertical. Each solar array 44, 46 is extended outwardly from the spacecraft body 21 and is aligned generally along an axis parallel to the second orthogonal axis of the spacecraft, which is substantially tangent to the orbital flight path. The third orthogonal axis is aligned substantially normal to the orbital plane. In the other attitude of the earth-oriented mode, the gravity gradient boom 58 is again aligned generally parallel to the first orthogonal axis, which is substantially aligned with the local vertical. Moreover, each solar array 44, 46 is extended outwardly from a point on the spacecraft body 21 which is generally along an axis parallel to the second orthogonal axis of the spacecraft. However, each of these arrays is rotated about that point toward the third orthogonal axis, so that if the spacecraft has two solar arrays, as in the illustrated embodiment, the arrays are rotated in opposite directions about axes parallel to the first orthogonal axis toward each other. This attitude is particularly advantageous when two or more substantially identical spacecraft are connected together in a side-by-side arrangement as shown in FIG. 6B.

The two alternative flight attitudes for the earth-oriented mode can be characterized in terms of the moments of inertia $I_{xx}$, $I_{yy}$ and $I_{zz}$ about the three orthogonal axes x, y and z, respectively, of the spacecraft. Referring to FIG. 6A, the spacecraft 20 includes a spacecraft body and is characterized by three orthogonal axes x, y and z. Two solar arrays 44 and 46 extend outwardly from the spacecraft body generally along the y axis, and a gravity gradient boom 58 is extendible and retractable relative to the spacecraft body generally along the x axis. The moment of inertia about the z axis ($I_{zz}$) is greater than the moment of inertia about the y axis ($I_{yy}$) which, in turn, is greater than the moment of inertia about the x axis ($I_{xx}$). Under these conditions, the x axis, having minimum moment of inertia, will align with the local vertical and point radially toward the earth. The y axis, having the next greatest moment of inertia, will align tangent to the flight path. The z axis, having the maximum moment of inertia, will align normal to the orbital plane. In this first attitude, the spacecraft 20 will be gravity-gradient stable and in a position of minimum aerodynamic drag since the solar arrays 44, 46 will lead and trail along the flight path. The solar arrays 44 and 46 may be rotated about the y and z axes of the spacecraft 20 when the planes of the arrays are not normal to the direction of solar radiation in order to maximize exposure of the solar arrays to the sun. When less than maximum exposure is required, then the solar arrays 44, 46 only need to be rotated about the y axis.

If the spacecraft has two solar arrays extending from points on opposite sides of the spacecraft body which are generally along the y axis of the spacecraft body, as in the illustrated embodiment, the arrays may be pivoted about these points in opposite angular directions toward the z axis of the spacecraft body. In this way, $I_{yy}$ may be made greater than $I_{zz}$ which, in turn, is greater than $I_{xx}$. Under these conditions, the x axis will align with the local vertical, the z axis will align tangent to the flight path, and the y axis will align normal to the orbital plane. In this second alternative attitude for the earth-oriented orbital flight mode, the spacecraft will be gravity-gradient stable and in a position of reduced aerodynamic drag since the solar arrays will both tend to lead or trail along the flight path.

This second attitude is particularly advantageous when two or more substantially identical spacecraft 20, 220 are connected together by their respective berthing mechanisms in a side-by-side arrangement as shown in FIG. 6B. The three orthogonal axes x, y and z of one spacecraft 20 are parallel to the same three axes of another spacecraft 220 to produce a coupled spacecraft having three orthogonal axes x', y' and z', parallel to the x, y and z axes of each individual spacecraft 20, 220. The two solar arrays 44, 46 and 244, 246 of each spacecraft 20, 220 may be pivoted in opposite directions toward the z axis of the spacecraft from which they extend, as described above, and the gravity gradient boom 58, 258 of each spacecraft 20, 220 may be extended or retracted generally along the x axis of that spacecraft. This can cause the moment of inertia about the y' axis ($I_{y'y'}$) of the coupled spacecraft to be greater than the moment of inertia about the z' axis ($I_{z'z'}$) which, in turn, is greater than the moment of inertia about the x' axis ($I_{x'x'}$). As a result, the x' axis will align with the local vertical, the z' axis will align tangent to the flight path, and the y' axis will align normal to the orbital plane. In this second alternative attitude, the coupled spacecraft will be gravity-gradient stable and in a position of reduced aerodynamic drag with the two solar arrays 44, 46 of one spacecraft 20 tending to lead and the two solar arrays 244, 246 of the other spacecraft 220 tending to trail along the orbital flight path.

In the quasi sun-oriented mode, the present spacecraft is capable of orbital flight in two alternative attitudes. In the attitude shown in FIG. 7A, the gravity gradient boom 58 is aligned generally parallel to a first orthogonal axis of the spacecraft 20, which lies substantially in the orbital plane. Each solar array 44, 46 is extended outwardly from the spacecraft body 21 generally along an axis parallel to a second orthogonal axis, which lies substantially in the orbital plane and which is substantially normal to the direction of solar radiation. The third orthogonal axis is aligned substantially normal to the orbital plane. In the other attitude of the quasi sun-oriented mode, the gravity gradient boom is aligned generally parallel to the first orthogonal axis, which lies substantially in the orbital plane. Each solar array is extended outwardly from a point on the spacecraft body which is generally along an axis parallel to the second orthogonal axis of the spacecraft and is rotated about that point toward the third orthogonal axis. The third orthogonal axis is aligned substantially normal to the orbital plane. In any spacecraft having two solar arrays, as in the illustrated embodiment, the arrays are pivoted in opposite angular directions toward each other. This attitude is particularly advantageous for the orbital flight of two or more spacecraft 20, 220 connected in a side-by-side arrangement as shown in FIG. 7B.

The two alternative flight attitudes for the quasi sun-oriented mode can be characterized in terms of the moments of inertia about the three orthogonal axes x, y and z of the spacecraft. Referring to FIG. 7A, if the spacecraft 20 is designed so that when the gravity gradient boom 58 is extended or retracted to a certain position the moment of inertia about the x axis ($I_{xx}$) is substantially equal to the moment of inertia about the y axis ($I_{yy}$), and both are less than the moment of inertia about the z axis ($I_{zz}$), then the z axis of the spacecraft will align normal to the orbital plane and the x and y axes will lie in the orbital plane in a neutrally stable attitude, since neither axis will have a greater tendency to align with the local vertical and point toward the earth. In this neutrally stable condition, the attitude of the spacecraft can be readily controlled with only small moments by active attitude control devices to align the y axis along which the solar arrays 44 and 46 generally extend so that it is normal to the direction of solar radiation. The solar arrays then need only be rotated about the y axis to maximize electrical power generation by tracking the sun as it moves across the orbital plane.

A spacecraft with two solar arrays, such as that described above, can be made neutrally stable by orienting the spacecraft in the second alternative attitude for the quasi sun-oriented orbital flight mode. By rotating the solar arrays about points on opposite sides of the spacecraft body which are generally along the y axis, in opposite directions toward the z axis, and by extending or retracting the gravity gradient boom to a position such that the moment of inertia about the x axis ($I_{xx}$) of the spacecraft is substantially equal to the moment of inertia about the z axis ($I_{zz}$), and both are less than the moment of inertia about the y axis ($I_{yy}$), then the y axis will align normal to the orbital plane and the x and z axes will lie in a neutrally stable attitude in the orbital plane. In this neutrally stable condition, the attitude can be readily controlled by active attitude control devices to align the z axis along which the solar arrays generally extend so that it is normal to the direction of solar radiation.

If two spacecraft are connected, as shown in FIG. 7B, and the two solar arrays 44, 46 and 244, 246 of each spacecraft 20, 220 are rotated in opposite directions toward the z axis of the spacecraft from which they extend, and the gravity gradient boom 58, 258 of each spacecraft 20, 220 is extended or retracted to a position such that the moment of inertia about the x' axis of the coupled spacecraft ($I_{x'x'}$) is substantially equal to the moment of inertia about the z' axis ($I_{z'z'}$) and both are less than the moment of inertia about the y' axis ($I_{y'y'}$), then the y' axis will align normal to the orbital plane and the x' and z' axes will lie in a neutrally stable attitude in the orbital plane. This attitude can be readily controlled by active attitude control devices to align the z' axis toward which the solar arrays have been rotated so that it is normal to the direction of solar radiation.

Since the spacecraft 20 of the present invention is preferably designed as a man-tended space platform for industrial and research purposes, the spacecraft 20 may contain equipment for processing of materials, such as electrophoresis equipment. Such equipment could include, for example, tanks for the raw materials to be processed, tanks for processing the materials, and tanks for the product and waste material. Depending on the type of process that is carried out by a particular spacecraft 20, these tanks may vary in size, number and location, and the materials they contain may have different densities. Such variations can affect the moments of inertia of the spacecraft. Moreover, during the course of the materials processing operation, the distribution of the mass within the spacecraft 20 will change as the various materials are pumped from one tank to another. This redistribution of the mass within the spacecraft 20 will also change the moments of inertia about the spacecraft's 20 three orthogonal axes. By extending or retracting the gravity gradient boom 58 or by adjusting the angle at which the device extends from the spacecraft body 21, it is possible to adjust the moments of inertia of the spacecraft 20 in order to compensate for these effects, and thereby maintain the attitude of the spacecraft 20 stable during its orbital flight. This will be particularly useful during a quasi sun-oriented flight mode in which the spacecraft 20 must be maintained neutrally stable in the orbital plane. It is also possible to adjust the natural frequency of the spacecraft 20 by extending or retracting the gravity gradient boom 58 or by adjusting its angle with respect to the spacecraft body 21.

The attitude control method of the present invention comprises stabilizing a spacecraft 20 in an earth-oriented orbital flight mode by extending or retracting the gravity gradient boom 58 during one period of time in which it is desired to minimize active attitude control, and stabilizing the spacecraft 20 in a quasi sun-oriented orbital flight mode by means of an active attitude control means during another period of time in which it is desired to maximize the power output of the solar arrays 44, 46. The gravity gradient boom 58 can also be employed in conjunction with the active attitude control means to stabilize the spacecraft 20 in the quasi sun-oriented mode. The present attitude control method can be used to control the orbital flight of a spacecraft 20 in a flight mode characterized by unequal moments of inertia about two orthogonal axes of the spacecraft 20 lying substantially in the orbital plane, or in a flight mode characterized by substantially equal moments of inertia about the same two orthogonal axes of the spacecraft. The method comprises extending or retracting the gravity gradient boom to one position in which $I_{zz}>I_{yy}>I_{xx}$, or to another position in which $I_{yy}>I_{zz}>I_{xx}$, in order to maintain the spacecraft 20 in one flight mode, or to one position in which $I_{zz}>I_{yy}\simeq I_{xx}$, or to another position in which $I_{yy}>I_{zz}\simeq I_{xx}$, in order to maintain the spacecraft 20 in the other flight mode. The method further comprises adjusting the angle at which the gravity gradient boom 58 extends relative to the spacecraft body 21 to maintain the spacecraft 20 in the desired attitude and flight mode. When the distribution of the mass within the spacecraft body changes during orbital flight, the method of the present invention comprises extending, retracting or changing the angle of the gravity gradient boom 58 to adjust at least one of the moments of inertia $I_{xx}$, $I_{yy}$ and $I_{zz}$ in order to compensate for the change in mass distribution and maintain the spacecraft 20 in the desired flight mode.

Although the present invention has been described with reference to a preferred embodiment, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A spacecraft adapted for orbital flight in two alternative modes, one of said modes being an earth-oriented mode, and the other of said modes being a quasi sun-oriented mode, said spacecraft comprising:

a spacecraft body;

at least one solar array extendible outwardly from the spacecraft body;
passive attitude control means utilizing gravity gradient stabilization means which is extendible and retractable relative to the spacecraft body; and
active attitude control means comprising means for sensing the spacecraft attitude and means operable in response to outputs from said attitude sensing means for producing attitude control torques;
said gravity gradient stabilization means when extended being effective to stabilize the spacecraft in the earth-oriented mode, and said active attitude control means being effective to stabilize the spacecraft in the quasi sun-oriented mode.

2. The spacecraft of claim 1 wherein the active attitude control means is effective in combination with the gravity gradient stabilization means to stabilize the spacecraft in the quasi sun-oriented mode.

3. The spacecraft of claim 1 wherein the gravity gradient stabilization means comprises an elongated member.

4. The spacecraft of claim 2 wherein the elongated member is a deployable lattice column.

5. The spacecraft of claim 3 wherein the gravity gradient stabilization means further comprises a weight attached to the outer end of said elongated member.

6. The spacecraft of claim 2 wherein the gravity gradient stabilization means further comprises means for adjusting the angle at which the gravity gradient means extends relative to the spacecraft body.

7. The spacecraft of claim 1 wherein the solar array further comprises a means for adjusting the angle at which the solar array extends relative to the spacecraft body.

8. The spacecraft of claim 1 comprising two solar arrays extending outwardly from opposite sides of the spacecraft body.

9. The spacecraft of claim 1, wherein the means for producing attitude control torques comprises a control moment gyroscope.

10. A spacecraft adapted for orbital flight in two alternative modes, a first of said modes being characterized by unequal moments of inertia about two orthogonal axes of the spacecraft lying in the orbital plane, and a second of said modes being characterized by substantially equal moments of inertia about the same two orthogonal axes of the spacecraft, said spacecraft comprising:
a spacecraft body having three orthogonal axes x, y, and z;
at least one solar array extendible outwardly from and rotatable about a point on the spacecraft body which is generally along the y axis;
gravity gradient stabilization means which is extendible and retractable relative to the spacecraft body generally parallel to the x axis;
said spacecraft being characterized by moments of inertia $I_{xx}$, $I_{yy}$, and $I_{zz}$ about the axes x, y, and z, respectively;
said gravity gradient stabilization means being extendible or retractable and said solar array being rotatable in said first orbital flight mode to a first position in which $I_{zz} > I_{yy} > I_{xx}$ and to a second position in which $I_{yy} > I_{zz} > I_{xx}$, and in said second orbital flight mode to a first position in which $I_{zz} > I_{yy} \approx I_{xx}$ and to a second position in which $I_{yy} > I_{zz} \approx I_{xx}$.

11. The spacecraft of claim 10 wherein the gravity gradient stabilization means comprises an elongated member.

12. The spacecraft of claim 11 wherein the elongated member is a deployable lattice column.

13. The spacecraft of claim 11 wherein the gravity gradient stabilization means further comprises a weight attached to the outer end of said elongated member.

14. The spacecraft of claim 11 wherein the gravity gradient stabilization means further comprises means for adjusting the angle at which the gravity gradient means extends from the spacecraft body.

15. The spacecraft of claim 10 comprising two solar arrays extending outwardly from opposite sides of the spacecraft body.

16. The spacecraft of claim 10 wherein the distribution of the mass within the spacecraft body is subject to change during orbital flight, and wherein the gravity gradient stabililzation means is extendible or retractable to adjust at least one of the moments of inertia $I_{xx}$, $I_{yy}$ and $I_{zz}$ to compensate for the change in mass distribution.

17. An attitude control method for controlling the orbital flight of a spacecraft in two alternative flight modes, (1) a first mode being an earth-oriented mode in which the first orthogonal axis of the spacecraft is substantially aligned with the local vertical, the second orthogonal axis is substantially in a direction tangent to the orbital flight path, and the third orthogonal axis is substantially normal to the orbital plane, and (2) a second mode being a quasi sun-oriented mode in which two of the orthogonal axes of the spacecraft lie substantially in the orbital plane, one of these two axes is substantially normal to the direction of solar radiation, and the third orthogonal axis is substantially normal to the orbital plane wherein said spacecraft comprises a spacecraft body; at least one solar array extendible outwardly from the spacecraft body; passive attitude control means utilizing gravity gradient stabilization means which is extendible and retractable relative to the spacecraft body; and active attitude control means; said attitude control method comprising:
stabilizing the spacecraft in an earth-oriented mode during a first period of time by extending or retracting the gravity gradient stabilization means; and
stabilizing the spacecraft in a quasi sun-oriented mode during a second period of time using the active attitude control means.

18. The method of claim 17 wherein the spacecraft is stabilized in the sun-oriented mode using the active attitude control means in conjunction with extending or retracting the gravity gradient stabilization means.

19. An attitude control method for controlling the orbital flight of a spacecraft in two alternative flight modes, a first of said modes being characterized by unequal moments of inertia about two orthogonal axes of the spacecraft lying in the orbital plane, and a second of said modes being characterized by substantially equal moments of inertia about the same two orthogonal axes of the spacecraft, wherein said spacecraft comprises a spacecraft body having three orthogonal axes x, y, and z; at least one solar array extendible outwardly from and rotatable about a point on the spacecraft body which is generally along the y axis; and gravity gradient stabilization means which is extendible and retractable relative to the spacecraft body generally along the x axis; said spacecraft being characterized by moments of inertia $I_{xx}$, $I_{yy}$, and $I_{zz}$ about the axes x, y, and z, respectively; said attitude control method comprising:

during a first period of time, extending or retracting the gravity gradient stabilization means and rotating the solar array to a first position in which $I_{zz} > I_{yy} > I_{xx}$ or to a second position in which $I_{yy} > I_{zz} > I_{xx}$ to maintain the spacecraft in the first flight mode; and during a second period of time, extending or retracting the gravity gradient stabilization means and rotating the solar array to a first position in which $I_{zz} > I_{yy} \cong I_{xx}$ or to a second position in which $I_{yy} > I_{zz} \cong I_{xx}$ to maintain the spacecraft in the second flight mode.

20. The method of claim 19 wherein the spacecraft further comprises means for adjusting the angle at which the gravity gradient stabilization means extends from the spacecraft body, said method further comprises adjusting the angle of the gravity gradient means relative to the spacecraft body to a first position in which $I_{zz} > I_{yy} > I_{xx}$ or to a second position in which $I_{yy} > I_{zz} > I_{xx}$ to maintain the spacecraft in the first flight mode or to a first position in which $I_{zz} > I_{yy} \cong I_{xx}$ or to a second position in which $I_{yy} > I_{zz} \cong I_{xx}$ to maintain the spacecraft in the second flight mode.

21. The method of claim 19, wherein the spacecraft is further characterized by a change in distribution of the mass within the spacecraft body during orbital flight, said method comprising extending or retracting the gravity gradient stabilization means to adjust at least one of the moments of inertia $I_{xx}$, $I_{yy}$ and $I_{zz}$ in order to compensate for the change in mass distribution and maintain the spacecraft in the desired flight mode.

* * * * *